US012767091B2

(12) United States Patent
Park et al.

(10) Patent No.: US 12,767,091 B2
(45) Date of Patent: Oct. 20, 2026

(54) APPARATUS AND METHOD FOR DISTINGUISHING RELAY/REPLAY SIGNAL IN PASSIVE KEYLESS ENTRY SYSTEM

(71) Applicants: Hyundai Motor Company, Seoul (KR); Kia Corporation, Seoul (KR)

(72) Inventors: Seung Wook Park, Yongin-si (KR); Chang Hun Jung, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 177 days.

(21) Appl. No.: 18/643,301

(22) Filed: Apr. 23, 2024

(65) Prior Publication Data

US 2026/0001510 A1 Jan. 1, 2026

(30) Foreign Application Priority Data

Oct. 31, 2023 (KR) ........................ 10-2023-0148501

(51) Int. Cl.
*B60R 25/24* (2013.01)
*B60R 25/04* (2013.01)

(52) U.S. Cl.
CPC .............. *B60R 25/24* (2013.01); *B60R 25/04* (2013.01)

(58) Field of Classification Search
CPC ....... B60R 25/24; B60R 25/04; B60R 25/246; B60R 25/248; B60R 2325/108; G07C 2009/00396; G07C 2009/00412; G07C 9/00309; G07C 2009/00555; H04W 12/122; H04W 12/10; H04L 9/06; H04L 9/3297
See application file for complete search history.

(56) References Cited

U.S. PATENT DOCUMENTS

| | | | | |
|---|---|---|---|---|
| 2019/0075454 | A1* | 3/2019 | Nowottnick | H04L 9/0656 |
| 2019/0232917 | A1* | 8/2019 | Meng | B60R 25/33 |
| 2022/0194316 | A1 | 6/2022 | Thomas et al. | |
| 2023/0074878 | A1* | 3/2023 | Björkengren | H04L 63/1466 |

FOREIGN PATENT DOCUMENTS

| | | | |
|---|---|---|---|
| CN | 107276748 | A | 10/2017 |
| EP | 3736780 | A1 | 11/2020 |

* cited by examiner

*Primary Examiner* — Omeed Alizada
(74) *Attorney, Agent, or Firm* — Slater Matsil, LLP

(57) ABSTRACT

A method of operating a passive keyless entry (PKE) system of a vehicle can include generating and transmitting to a smart key, a first signal including a first random number and a first timestamp value, receiving from the smart key, a second signal including a second hash value and a second timestamp value, generating a third timestamp value, comparing a first difference between the second timestamp value and the first timestamp value with a first threshold for determining whether a relay signal has occurred, comparing a second difference between the third timestamp value and the second timestamp value with a second threshold for determining whether a relay signal and/or a replay signal has occurred, and comparing a first hash value based on the first timestamp value with the second hash value to determine whether to allow access to and start up of the vehicle.

20 Claims, 6 Drawing Sheets

APPARATUS AND METHOD FOR DISTINGUISHING RELAY/REPLAY SIGNAL IN PASSIVE KEYLESS ENTRY SYSTEM

CROSS-REFERENCE TO RELATED APPLICATIONS

This application claims the benefit of Korean Patent Application Number 10-2023-0148501, filed on Oct. 31, 2023, which application is hereby incorporated herein by reference.

TECHNICAL FIELD

The present disclosure relates to a passive keyless entry (PKE) system for a vehicle.

BACKGROUND

The statements in this section merely provide background information related to the present disclosure and do not necessarily constitute prior art.

Passive keyless entry (PKE) technology seeks to increase user convenience by allowing a user's smart key and the vehicle's PKE system to communicate to enable the vehicle to unlock the vehicle's doors and/or start the vehicle by verifying the proximity of the smart key to the vehicle without the driver directly actuating the PKE device.

The vehicle and the smart key may use two different frequency channel signals to communicate with each other. For example, the vehicle may use a low frequency (LF) signal with a short range of two to three meters, and the smart key may use an ultra-high frequency (UHF) signal with a range of approximately 20 to 50 meters to remotely control the vehicle. The vehicle's PKE system periodically sends around the vehicle LF signals for confirmation of the smart key presence and/or as wake-up signals, which are received by the smart key that is responsive to the received LF signal for waking up and sending a UHF signal for confirmation of the smart key presence to the vehicle. Upon confirmation of the smart key presence, the PKE system of the vehicle sends an LF signal including challenge information back to the smart key, and the smart key sends the vehicle a UHF signal including response information in response to the challenge. Upon validation of the received response information, the vehicle's PKE system performs vehicle control, e.g., opening and closing vehicle doors, starting the vehicle, etc.

Such PKE systems may be vulnerable to relay attacks or replay attacks. A relay attack could occur with the user's smart key and the vehicle separated remotely when two signal repeaters are used to amplify and forward signals from the vehicle and the smart key, respectively. A replay attack tactic involves the attacker to eavesdrop and store a valid signal at the time it is transmitted, and to later transmit a signal as if it were a legitimate smart key. Because the replay attack sends the original data as it was originally sent and received, the attacker can use even encrypted data without decrypting it for attacks.

In such a relay attack or replay attack, the vehicle cannot determine whether the response signal sent by a smart key in response to a query is actually from a legitimate smart key, resulting in a defeated authentication process of the PKE system.

SUMMARY

The present disclosure in some embodiments relates to an apparatus and method for distinguishing against a relay signal and a replay signal in a passive keyless entry (PKE) system.

Some embodiments of the present disclosure provide an apparatus and method for accurately distinguishing between normal and relay/replay signals in a PKE system.

Some embodiments of the present disclosure provide an apparatus and method for preventing theft of a driver's vehicle and theft of items inside the vehicle, and for providing convenience to the driver.

The advantages of some embodiments of the present disclosure are not necessarily limited to those particularly described hereinabove, and the above and other advantages that some embodiments of the present disclosure could achieve can be clearly understood by those skilled in the art from the following detailed description.

According to some embodiments of the present disclosure, a method of distinguishing against a relay signal and a replay signal in a passive keyless entry (PKE) system, includes generating and transmitting to a smart key, a first signal including a first random number and a first timestamp value, receiving from the smart key, a second signal including a hash value and a second timestamp value, generating a third timestamp value, comparing a difference between the second timestamp value and the first timestamp value with a first threshold, and determining that the relay signal has occurred when the difference between the second timestamp value and the first timestamp value equals to or greater than the first threshold.

According to some embodiments of the present disclosure, an apparatus for distinguishing against a relay signal and a replay signal in a passive keyless entry (PKE) system, includes a memory configured to store commands, and a processor configured to generate and transmit to a smart key, a first signal including a first random number and a first timestamp value, to receive from the smart key, a second signal including a hash value and a second timestamp value, to generate a third timestamp value, to compare a difference between the second timestamp value and the first timestamp value with a first threshold, and to determine that the relay signal has occurred when the difference between the second timestamp value and the first timestamp value equals to or greater than the first threshold.

DETAILED DESCRIPTION OF ILLUSTRATIVE EMBODIMENTS

Figure 1A:
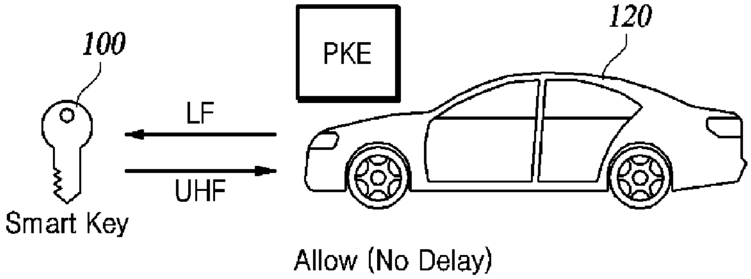
FIG. 1A to FIG. 1C are illustrative diagrams of an authentication process between a smart key and a PKE system, according to some embodiments of the present disclosure.

Hereinafter, some embodiments of the present disclosure will be described in detail with reference to the accompanying drawings. In the following description, like reference numerals can designate like elements, even though the elements can be shown in different drawings. Further, the following description of some embodiments can omit, for the purpose of clarity and for brevity, a detailed description of related known components and functions when considered obscuring the subject of the present disclosure.

Various ordinal numbers or alpha codes such as “first”, “second”, “A”, “B”, “(a)”, “(b)”, etc., can be prefixed solely to differentiate one component from the other but not to necessarily imply or suggest the substances, order, or sequence of the components. Throughout this specification, when a part “includes” or “comprises” a component, the part is meant to allow for further including other components and to not exclude other components, unless specifically stated to the contrary. Terms such as “unit,” “module,” and the like can refer to units in which at least one function or operation is processed and they may be implemented by hardware, software, or a combination thereof.

Some embodiments of the present disclosure relates to apparatuses and methods for defending against relay and replay attacks when opening a vehicle door with a smart key. As used herein, a smart key can refer to a PKE device carried by a user and interworking with a PKE system, which may be a dedicated device for PKE services, such as a key fob, or a mobile device running a PKE application. Some embodiments of the present disclosure may utilize the hash value and information on the time it takes to generate the hash for authentication between the PKE system and the smart key to distinguish relay/replay signals from legitimate signals. Some embodiments of the present disclosure may support mutual authentication by using a hash based on a secret key and may support staged checking by breaking down a processing interval and verifying the time taken for the relevant processing, rather than the total processing time.

Figure 1B:
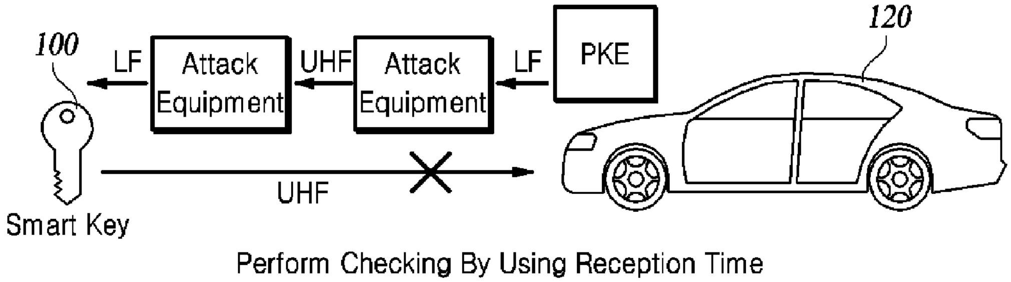
Figure 1C:
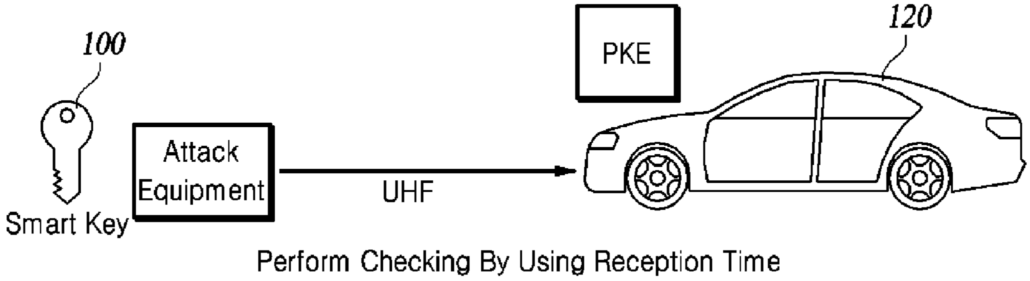

FIG. 1A to FIG. 1C are illustrative diagrams of an authentication process between a smart key and a PKE system, according to some embodiments of the present disclosure.

FIG. 1A illustrates an example PKE system.

The PKE system can be mounted on the vehicle and can control access and startup, such as unlocking or starting the vehicle.

The PKE system of the vehicle can periodically transmit an LF signal around the vehicle. A smart key that receives the LF signal can wake up and transmit a UHF (ultra-high frequency) signal to the PKE system of the vehicle as a response signal to the received LF signal.

When the smart key presence is confirmed based on the UHF signal, the PKE system can send the LF signal including query information back to the smart key, which then can send to the vehicle’s PKE system the UHF signal including response information corresponding to the query. When the received response information is properly verified, the vehicle’s PKE system can decide to authorize the access and startup. This example case sees no delay occurred between the PKE system and the smart key.

FIG. 1B illustrates another example PKE system.

FIG. 1B shows attack equipment that may intercept the LF signal with a short range and perform amplification or band conversion, resulting in an extended signal range of the LF signal. Thus, because the smart key cannot deliver the UHF signal to the PKE system at the correct time, the PKE system can have difficulty interpreting the UHF signal and checking for the time delay conditions to determine whether access and startup are authorized.

FIG. 1C illustrates yet another example PKE system.

Replay attack equipment may be utilized to recycle and re-transmit previously received smart key signals at a later time. Therefore, the PKE system can have difficulty interpreting the UHF signal and checking for time delay conditions to determine whether access and startup are authorized.

Figure 2:
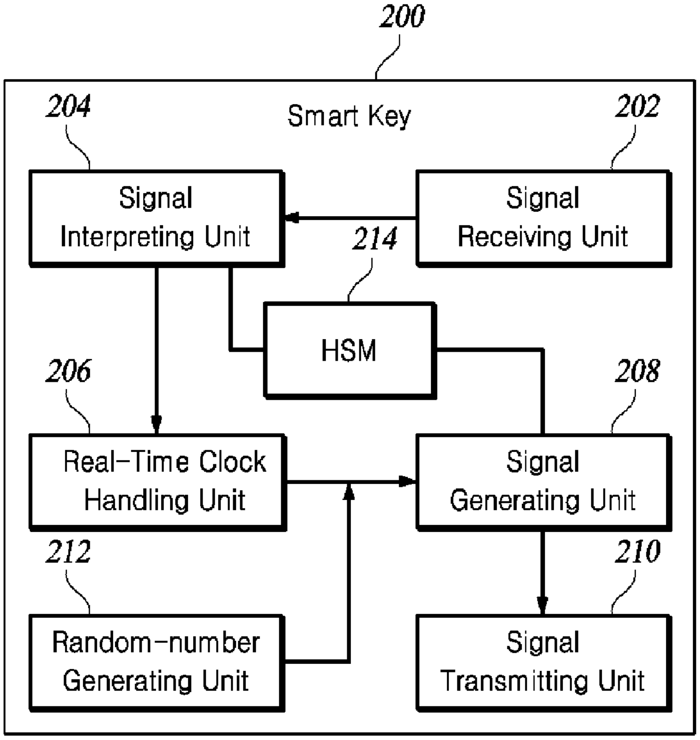
FIG. 2 is a block diagram of a smart key according to some embodiments of the present disclosure.

FIG. 2 is a block diagram of a smart key 200 according to some embodiments of the present disclosure.

A smart key 200 according to at least one embodiment of the present disclosure can include a signal receiving unit 202, a signal interpreting unit 204, a real-time clock handling unit 206, a signal generating unit 208, a signal transmitting unit 210, a random-number generating unit 212, a hardware security module (HSM) 214, and the like.

The signal receiving unit 202 can receive the LF signal transmitted by the PKE system. The PKE system can refer to a smart key system in a vehicle.

The signal interpreting unit 204 can digitize the signal and can extract the received visual data and random number data. The HSM 214 may be employed for communication using encryption/decryption. The HSM 214 may be a chip that is housed within the smart key 200 and can be capable of preventing unauthorized physical access to internally stored information.

The real-time clock handling unit 206 can generate time information that adjusts the time of a real-time clock embedded in the smart key 200 to the received time of the signal and delivers the generated time information to the signal generating unit 208.

The random-number generating unit 212 can generate a random number and deliver it to the signal generating unit 208.

The signal generating unit 208 can use the random number generated by the random-number generating unit 212 and the time information generated by the real-time clock handling unit 206, as bases for converting the data included in the response data into a UHF signal and thereby generating a response UHF signal. HSM encryption may be applied to the response UHF signal.

The signal transmitting unit 210 may transmit the response UHF signal from the signal generating unit 208 to the PKE system.

Figure 3:
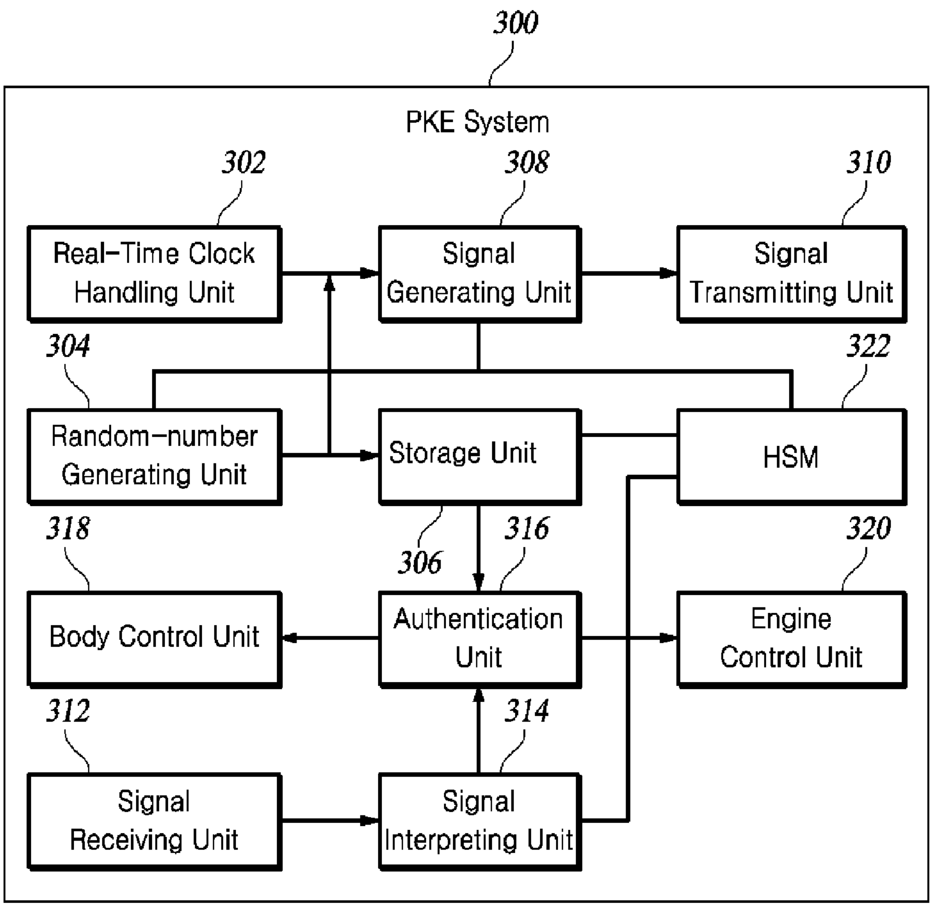
FIG. 3 is a block diagram of a PKE system according to some embodiments of the present disclosure.

FIG. 3 is a block diagram of a PKE system 300 according to some embodiments of the present disclosure.

A PKE system 300 according to at least one embodiment of the present disclosure can include a real-time clock handling unit 302, a random-number generating unit 304, a storage unit 306, a signal generating unit 308, a signal transmitting unit 310, a signal receiving unit 312, a signal interpreting unit 314, an authentication unit 316, a body control unit 318, an engine control unit 320, an HSM 322, and the like.

The real-time clock handling unit 302 can measure and transmit the current time to the signal generating unit 308.

The random-number generating unit 304 can generate and deliver a random number to the signal generating unit 308. The random-number generating unit 304 may utilize the HSM 322 to generate the random number.

The storage unit 306 can store the time measured by the real-time clock handling unit 302.

The signal generating unit 308 can receive the random number generated by the random-number generating unit 304 and the time data measured by the real-time clock handling unit 302 to generate challenge data and can convert the challenge data into an LF signal. The data before conversion can be encrypted by the HSM 322.

The signal transmitting unit 310 can transmit the LF signal generated by the signal generating unit 308 to the smart key 200.

The signal receiving unit 312 can receive a response UHF signal from the smart key 200. The response UHF signal may be referred to as a UHF signal or a response signal.

The signal interpreting unit 314 can convert the response UHF signal into digital data in a decryption process and can extract the visual data and random number data contained in the response signal. The signal interpreting unit 314 can utilize the HSM 322 to perform the decryption process.

The authentication unit 316 can check the random number and visual data, and according to the checking result, can authorize the body control unit 318 and the engine control unit 320 to access and startup, respectively. The checking result can be displayed on the system's liquid crystal display (LCD) to notify the user.

The body control unit 318 can control access to the vehicle according to the checking result of the authentication unit 316.

The engine control unit 320 can control the vehicle startup according to the checking result of the authentication unit 316.

Figure 4:
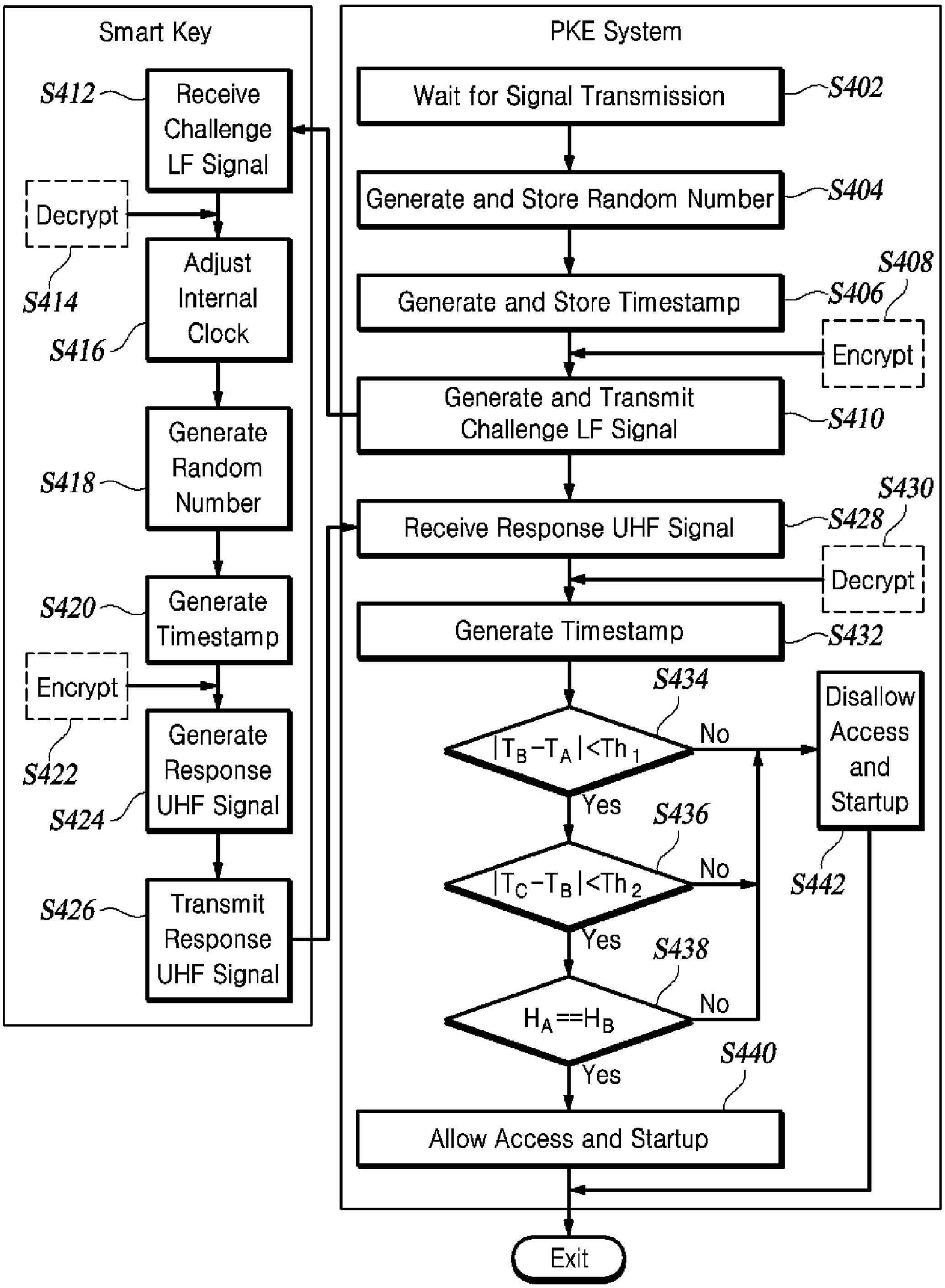
FIG. 4 is a flowchart of an operation of a smart key and PKE system according to some embodiments of the present disclosure.

FIG. 4 is a flowchart of the operation of a smart key and PKE system according to some embodiments of the present disclosure.

The PKE system can wait for LF signal transmission for some time in operation S402.

In operation S404, the PKE system can generate a random number ($N_A$) for seeding by using the HSM and store it in the storage unit.

In operation S406, the PKE system can check the current time ($T_A$) by using the internal real-time clock (RTC) and store it in the storage unit.

In operation S410, the PKE system can generate a challenge signal (LF signal) including the random number ($N_A$) and the timestamp ($T_A$), and transmit it externally. The PKE system may selectively perform HSM-based encryption operation using a pre-shared symmetric key in operation S408 before the LF signal is generated.

In operation S412, the smart key can receive the challenge signal transmitted by the PKE.

In operation S414, the smart key may decrypt the received challenge signal by using the HSM.

In operation S416, the smart key can update the time of the real-time clock in the smart key to the timestamp value ($T_A$) contained in the received challenge signal.

In operation S418, the smart key can store a random number ($N_B$) contained in the challenge signal.

In operation S420, the smart key can check again the current time ($T_B$) and calculate a hash value ($H_B$) for $N_B$. A shared secret key ($K_S$) can be used to calculate the hash value ($H_B$). In some embodiments of the present disclosure, a shared secret key can be used for hash calculation and a shared symmetric key can be used for encryption using the HSM.

In operation S424, the smart key can generate a response signal (UHF signal) including the current timestamp ($T_B$) and the hash ($H_B$). The smart key may selectively perform HSM-based encryption operation using a pre-shared symmetric key in operation S422 before the UHF signal is generated.

In operation S426, the smart key can transmit the generated response signal (UHF signal) externally.

In operation S428, the PKE system may receive a response signal from the smart key.

In operation S430, the PKE system may decrypt the received response signal by using the HSM.

In operation S432, the PKE system can determine the current time ($T_C$). In other words, the PKE system can generate the timestamp.

In operation S434, the PKE system can calculate $|T_B-T_A|$, which can represent the time taken for the smart key to receive the challenge signal and transmit the response signal, and can determine if $|T_B-T_A|$ is less than a predetermined threshold ($Th_1$). Operation S434 can be an operation for determining an occurrence of replay attack delay, for example.

If $|T_B-T_A|$ is less than a set or predetermined threshold ($Th_1$), the PKE system can calculate, in operation S436, $|T_C-T_B|$, which can represent the time between the smart key sending the response signal and the PKE system receiving the response signal, and can determine whether $|T_C-T_B|$ is less than a set or predetermined threshold ($Th_2$). Operation S436 can be an operation for determining an occurrence of relay/replay attack delay, for example.

If $|T_C-T_B|$ is less than the set or predetermined threshold ($Th_2$), the PKE system can compare, in operation S438, the hash ($H_B$) contained in the received response signal with a hash ($H_A$) of the random number ($N_A$).

$H_A$ can be calculated by using a shared secret key that the PKE system can share with the smart key.

If $H_B$ and $H_A$ are equal, then authentication can be successful and the PKE system can allow access and startup in operation S440.

However, if $|T_B-T_A|$ is greater than or equal to the set or predetermined threshold ($Th_1$) in operation S434, or $|T_C-T_B|$ is greater than or equal to the set or predetermined threshold ($Th_2$) in operation S436, or $H_B$ and $H_A$ are not equal in operation S438, then authentication can fail and the PKE system can disallow access and startup in operation S442.

Some embodiments of the present disclosure can utilize time synchronization, signal processing time within a smart key, communication link latency, and the like, for attack detection to reduce the time it takes to distinguish between legitimate signals and relay/replay signals.

Some embodiments of the present disclosure can determine whether attack equipment is utilized, determine whether a signal is recycled, and ensure the confidentiality of signals, all together.

Some embodiments of the present disclosure can prevent replay attacks and relay attacks by enabling staged checking through segmentation of a comparative verification, such as operations S434 to S438 of FIG. 4 for example.

Although the aforementioned drawings present respective operations as being sequentially performed, they can merely instantiate some technical ideas of some embodiments of the present disclosure. Therefore, a person having ordinary skill in the pertinent art can incorporate various modifications, additions, and substitutions in practicing an embodiment of the present disclosure by changing the sequence of operations illustrated in the drawings or by performing one or more of the operations thereof in parallel, without departing from the essential nature of some embodiments of the present disclosure, and hence the operations in the drawings are not necessarily limited to the illustrated chronological sequences.

The operations illustrated in FIG. 4 can be implemented as computer-readable codes on a computer-readable recording medium. The computer-readable recording medium can include any type of recording device on which data that can be read by a computer system are recordable. Examples of computer-readable recording medium include non-transitory medium such as a ROM, a RAM, a CD-ROM, a magnetic tape, a floppy disk, and an optical data storage. Further, a computer-readable recording medium can be distributed in computer systems connected via a network, wherein the computer-readable codes can be stored and executed in a distributed mode.

Further, components of some embodiments of the present disclosure may utilize integrated circuit structures such as memories, processors, logic circuits, look-up tables, and the like. These integrated circuit structures can perform each of the functions described herein under the control of one or more microprocessors or other control devices. Further, components of some embodiments of the present disclosure may be specifically implemented by a portion of a program or code that includes one or more executable instructions for performing a particular logical function and can be executed by one or more microprocessors or other control devices. Components of some embodiments of the present disclosure may include or be implemented by a central processing unit (CPU), microprocessor, or the like that performs their respective functions. Components of some embodiments of the present disclosure may store instructions executed by one or more processors in one or more memories.

Some embodiments of the present disclosure can accurately distinguish against relay signals in a PKE system.

Some embodiments of the present disclosure can prevent theft of a driver's vehicle and theft of items inside the vehicle, and provide convenience to the driver.

Some embodiments of the present disclosure can enable a staged checking through segmentation of the comparative verification to accurately distinguish against relay signals.

Some embodiments of the present disclosure can accurately distinguish against relay signals and replay signals to defend against both relay attacks and replay attacks.

The advantages and functionalities of some embodiments of the present disclosure are not necessarily limited to those mentioned above, and other unmentioned advantages and functionalities can be clearly understood by those skilled in the art from the above description.

Although example embodiments of the present disclosure have been described for illustrative purposes, those skilled in the art will appreciate that various modifications, additions, and substitutions are possible, without departing from the idea and scope of the present disclosure. Therefore, example embodiments of the present disclosure have been described for the sake of brevity and clarity. The scope of technical ideas of embodiments of the present disclosure is not necessarily limited by the illustrations. Accordingly, one of ordinary skill would understand the scope of the present disclosure is not to be limited by the above explicitly described embodiments but by the claims and equivalents thereof.

What is claimed is:

1. A method of operating a passive keyless entry (PKE) system of a vehicle, the method comprising:

generating a first signal including a first random number and a first timestamp value;

generating a first hash value based on the first random number;

transmitting the first signal to a smart key;

receiving, from the smart key, a second signal including a second hash value and a second timestamp value;

determining that a relay signal has occurred based on a first difference between the second timestamp value and the first timestamp value being equal to or greater than a first threshold, wherein the second hash value represents a hash value of the first random number included in the first signal that the smart key has received from the PKE system, and wherein the second hash value is determined using a shared secret key shared between the PKE system and the smart key; and allowing access to or startup of the vehicle based on the first hash value being equal to the second hash value.

2. The method of claim 1, wherein the first difference between the second timestamp value and the first timestamp value indicates a first sum of a first time elapsed for the smart key to receive the first signal from the PKE system and a second time elapsed for the smart key to transmit the second signal to the PKE system.

3. The method of claim 1, further comprising:

generating a third timestamp value upon receiving the second signal; and based on the first difference between the second timestamp value and the first timestamp value being less than the first threshold, comparing a second difference between the third timestamp value and the second timestamp value with a second threshold, and determining that one of or both of the relay signal and a replay signal has occurred in-based on the second difference between the third timestamp value and the second timestamp value being equal to or greater than the second threshold.

4. The method of claim 3, wherein the second difference between the third timestamp value and the second timestamp value indicates a second sum of a second time elapsed for the smart key to transmit the second signal to the PKE system and a third time elapsed for the PKE system to receive the second signal.

5. The method of claim 3, further comprising:

based on the second difference between the third timestamp value and the second timestamp value being less than the second threshold, comparing the first hash value with the second hash value contained in the second signal.

6. The method of claim 5, further comprising disallowing access to or startup of the vehicle based on the first hash value being not equal to the second hash value contained in the second signal.

7. The method of claim 1, wherein the first signal comprises a low frequency signal, and the second signal comprises an ultra-high frequency signal.

8. A passive keyless entry (PKE) system for a vehicle, the system comprising:

a non-transitory memory configured to store computer-executable code; and a processor configured to execute the code, wherein the code comprises commands for the processor to:

generate a first signal including a first random number and a first timestamp value;

generate a first hash value based on the first random number;

transmit the first signal to a smart key;

receive, from the smart key, a second signal including a second hash value and a second timestamp value;

determine that a relay signal has occurred based on a first difference between the second timestamp value and the first timestamp value being equal to or greater than a first threshold, wherein the second hash value represents a hash value of the first random number included in the first signal that the smart key has received from the PKE system, and wherein the second hash value is determined using a shared secret key shared between the PKE system and the smart key; and allow access to or startup of the vehicle based on the first hash value being equal to the second hash value.

9. The system of claim 8, wherein the first difference between the second timestamp value and the first timestamp value indicates a first sum of a first time elapsed for the smart key to receive the first signal from the PKE system and a second time elapsed for the smart key to transmit the second signal to the PKE system.

10. The system of claim 8, wherein the code comprises further commands for the processor to:

generate a third timestamp value upon receiving the second signal;

compare a second difference between the third timestamp value and the second timestamp value with a second threshold based on the first difference between the second timestamp value and the first timestamp value being less than the first threshold; and determine that one of or both of the relay signal and a replay signal has occurred based on the second difference between the third timestamp value and the second timestamp value being equal to or greater than the second threshold.

11. The system of claim 10, wherein the second difference between the third timestamp value and the second timestamp value indicates a second sum of a second time elapsed for the smart key to transmit the second signal to the PKE system and a third time elapsed for the PKE system to receive the second signal.

12. The system of claim 10, wherein the code comprises a further command for the processor to:

compare the first hash value with the second hash value contained in the second signal in response to the second difference between the third timestamp value and the second timestamp value being less than the second threshold.

13. The system of claim 8, wherein the code comprises commands for the processor to disallow access to or startup of the vehicle based on the first hash value being not equal to the second hash value.

14. The system of claim 8, wherein the first signal comprises a low frequency signal, and the second signal comprises an ultra-high frequency signal.

15. A method of operating a smart key for a vehicle, the method comprising:

receiving, from a passive keyless entry (PKE) system of the vehicle, a first signal including a first random number and a first timestamp value, wherein a first hash value is generated by the PKE system based on the first random number;

generating a second hash value a second timestamp value; and transmitting to the PKE system, a second signal including the second hash value and the second timestamp value, wherein the PKE system is configured to determine that a relay signal has occurred based on a first difference between the second timestamp value and the first timestamp value being equal to or greater than a first threshold, wherein the second hash value represents a hash value of the first random number included in the first signal that the smart key has received from the PKE system, and wherein the second hash value is determined using a shared secret key shared between the PKE system and the smart key, and wherein the PKE system allows access to or startup of the vehicle based on the first hash value being equal to the second hash value.

16. The method of claim 15, wherein the first difference between the second timestamp value and the first timestamp value indicates a first sum for a first time elapsed for the smart key to receive the first signal from the PKE system and a second time elapsed for the smart key to transmit the second signal to the PKE system.

17. The method of claim 15, wherein the PKE system is further configured to generate a third timestamp value based on a receipt of the second signal, compare a second difference between the third timestamp value and the second timestamp value with a second threshold based on the first difference between the second timestamp value and the first timestamp value being less than the first threshold, and to determine that one of or both of the relay signal and a replay signal has occurred based on the second difference between the third timestamp value and the second timestamp value being equal to or greater than the second threshold.

18. The method of claim 17, wherein the second difference between the third timestamp value and the second timestamp value indicates a second sum of a second time elapsed for the smart key to transmit the second signal to the PKE system and a third time elapsed for the PKE system to receive the second signal.

19. The method of claim 17, wherein the PKE system is configured to compare the first hash value with the second hash value contained in the second signal based on the second difference between the third timestamp value and the second timestamp value being less than the second threshold.

20. The method of claim 19, wherein the PKE system is configured further to disallow access to or startup of the vehicle based on the first hash value being not equal to the second hash value.

* * * * *